United States Patent [19]

Hong

[11] Patent Number: 4,956,712
[45] Date of Patent: Sep. 11, 1990

[54] APPARATUS FOR DELAYING A SUB-AURAL SIGNAL IN A TELEVISION RECEIVER

[75] Inventor: Sam P. Hong, Seoul, Rep. of Korea

[73] Assignee: Goldstar Co. Ltd., Seoul, Rep. of Korea

[21] Appl. No.: 344,376

[22] Filed: Apr. 28, 1989

[30] Foreign Application Priority Data

Apr. 30, 1988 [KR] Rep. of Korea ............. 5037/1988

[51] Int. Cl.$^5$ ............................................. H04N 5/60
[52] U.S. Cl. ............................... 358/198; 358/143; 381/2
[58] Field of Search ............... 358/197, 198, 143, 144; 381/2, 3, 4

[56] References Cited

U.S. PATENT DOCUMENTS

| | | | |
|---|---|---|---|
| 4,449,229 | 5/1984 | Mori | 381/2 |
| 4,461,021 | 7/1984 | Schwartz et al. | 358/198 X |
| 4,472,830 | 9/1984 | Nagai | 381/2 |
| 4,486,897 | 12/1984 | Nagai | 381/2 |
| 4,555,730 | 11/1985 | Briggs | 358/143 X |
| 4,652,919 | 3/1987 | Devino | 358/143 |
| 4,656,512 | 4/1987 | Devino | 358/143 |
| 4,803,727 | 2/1989 | Holt et al. | 381/2 |
| 4,814,874 | 3/1989 | Adachi | 358/143 X |

Primary Examiner—James J. Groody
Assistant Examiner—Mark R. Powell

[57] ABSTRACT

An apparatus for delaying a sub-aural (i.e., subchannel) signal in a television receiver of a sound multiplex system is provided, which is capable of outputting the sub-aural signal later than the main aural signal by a predetermined time interval. The apparatus is provided with a delaying circuit including an input clock generator, an output clock generator, an A/D converter for converting the output signal of a band-pass filter into a digital signal by setting down the input clock signal from the input clock signal generator at a sampling frequency, a memory for storing the output of the A/D converter, a D/A converter for converting the output signal of the memory into an analog signal by setting down the output clock signal from the output clock signal generator at a sampling frequency, and an output holding section for holding the output signal of the D/A converter by synchronizing the output signal of the D/A converter with the output signal from the output clock generator.

4 Claims, 2 Drawing sheets

APPARATUS FOR DELAYING A SUB-AURAL SIGNAL IN A TELEVISION RECEIVER

BACKGROUND OF THE INVENTION

The present invention relates to an apparatus for delaying a sub-aural signal in a television receiver which receives a sound mutiplex broadcasting signal and outputs the signal as a main aural signal and a sub-aural (i.e., subchannel) signal, and more particulary to an apparatus for delaying a sub-aural signal which is capable of outputting the sub-aural signal later than the main aural signal by a predetermined time interval.

In a conventional television receiver for a sound multiplex broadcasting system, as illustrated in FIG. 3, a multiplex aural signal input terminal 30 is connected in common to inputs of band-pass filters 31 and 32. The outputs of the band-pass filters 31 and 32 are connected through amplifiers 33 and 34 to output terminals 35 and 36 for the main and sub-aural signals.

Accordingly, when the aural broadcasting is a two-language broadcasting system, a main aural signal among the multiplex aural signals, which are input to the multiplex aural signal input terminal 30, is output to the main aural signal output terminal 35 through the band-pass filter 31 and the amplifier 33, while a sub-aural signal is output to the sub-aural output terminal 36 through the band-pass filter 32 and the amplifier 34. In the above system, the main aural signal is, in general, a signal for a native language and the sub-aural signal is a signal for a foreign language.

However, in such a conventional television receiver for a sound multiplex broadcasting system there has been some difficulties in clearly understanding the sub-aural signal, i.e., a foreign language, since the main aural signal and the sub-aural signal are simultaneously output to the main aural signal output terminal 35 and the sub-aural signal output terminal 36.

Even though each individual has a different capacity for understanding a foreign language, it is difficult for the majority of the listeners and viewers to understand the foreign language while listening to the native language and the foreign language simultaneously since the majority of the listeners and the viewers more quickly understand their native language than a foreign language.

SUMMARY OF THE INVENTION

One object of the present invention is to provide an apparatus for delaying a sub-aural signal in a sound multiplex television receiver so that the listeners and viewers can more easily understand a foreign language by outputting a main aural signal prior to a sub-aural signal by a predetermined time interval.

The object of the present invention is attained by a in which connecting a multiplex aural signal input terminal through a first band-pass filter and an amplifier to a main aural signal output terminal. The multiplex aural signal input terminal is connected through a second band-pass filter, a delaying section and an amplifier to a sub-aural signal output terminal so that the sub-aural signal being passed through the second band-pass filter is delayed at the delaying section by a predetermined time.

BRIEF DESCRIPTION OF THE DRAWINGS

The above and other objects, features and advantages of the present invention will become apparent from the following detailed description taken in conjunction with the accompanying drawings, in which.

DETAILED DESCRIPTION FOR THE PREFERRED EMBODIMENTS OF THE PRESENT INVENTION

Figure 1:
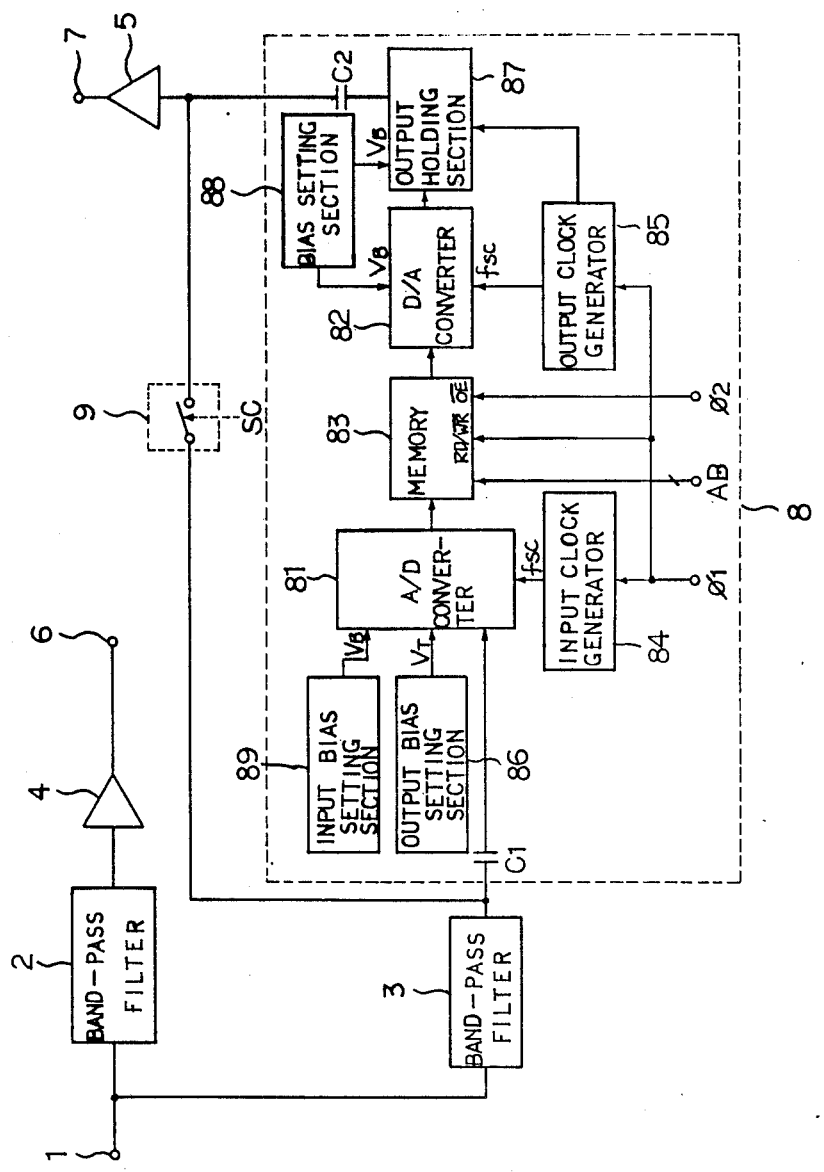
FIG. 1 is a circuit diagram illustrating apparatus for delaying a sub-aural signal of a television receiver according an embodiment of the present invention.

Referring to FIG. 1, the apparatus for delaying sub-aural signal, according to an embodiment of the present invention, is constituted so that a multiple aural signal input terminal 1 is connected through a first band-pass filter 2 and a first amplifier 4 to a main aural signal output terminal 6. The multiple aural signal input terminal 1 is connected also in common to the inputs of a delaying section 8 and a switching section 9 through a second band-pass filter 3. The outputs of the delaying section 8 and the switching section 9 are connected to a sub-aural output terminal 7 commonly through a second amplifier 5. The delaying section 8 includes an input clock generator 84 and an output clock generator 85 for generating an input clock signal and an output clock signal, respectively, from a clock signal $\emptyset 1$; an analog/digital converter 81 for converting the output signal of the second band-pass filter 3 into a digital signal by setting down the input clock signal generated from the input clock generator 84 at a sampling frequency (fsc); a memory 83, which is turned to a read/write-state depending upon the level of the clock signal $\emptyset 1$ and is turned to an output enable-state by the clock signal $\emptyset 2$, for storing and outputting the output signal of the analog/digital converter 81; a digital/analog converter 82 for converting the output signal of the memory 83 by setting down the output clock signal generated from the output clock generator 85 at a sampling frequency (fsc); an output holding section 87 for holding and outputting the output signal of the digital/analog converter 82 by synchronizing the output signal with the output clock signal generated from the output clock generator 85; an input bias setting section 89 for setting the input bias of the analog/digital converter 81 and a clamp regulating section 86 for regulating a clamp; and a bias setting section 88 for setting the reference bias of the digital/analog converter 82 and output holding section 87. In the above described apparatus, the delaying section 8 and the switching section 9 are so constructed that either the switching section 9 is shortcircuited or the delaying section 8 performs a delaying operation in response to a microcomputer which will be described hereinafter.

Figure 2:
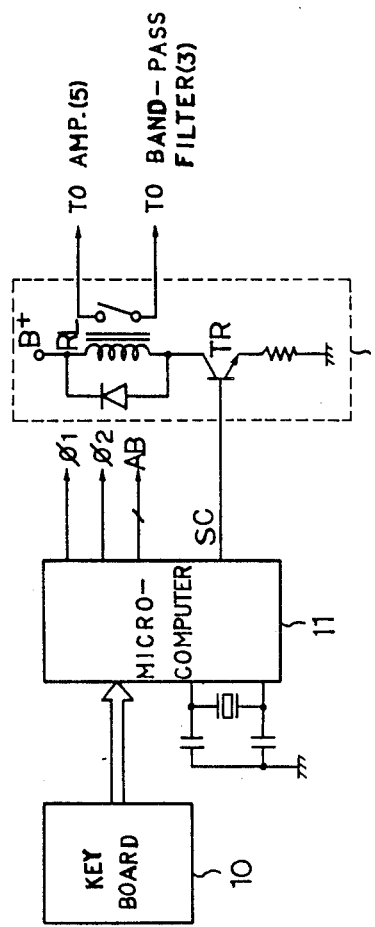
FIG. 2 is a circuit diagram illustrating a control section for controlling a delaying section and a switching section if the apparatus in FIG. 1.
Figure 3:
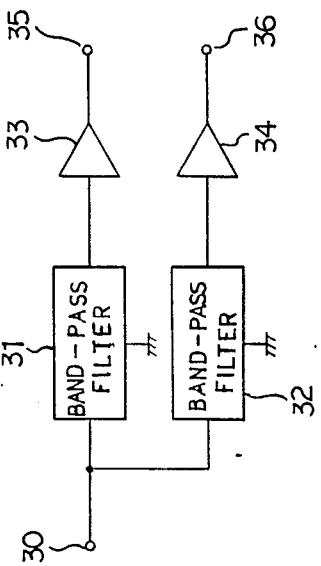
FIG. 3 is a schematic circuit diagram illustrating a conventional sound multiplex system television receiver

Referring to FIG. 2, a detailed circuit diagram of a control section for controlling the delaying section 8 and the switching section 9 of FIG. 1 is illustrated.

As illustrated in FIG. 2, the control section includes a key board 10 having a sub-aural signal delay selection switch (not illustrated), and a microcomputer 11 which outputs various control signals $\emptyset 1$, $\emptyset 2$ and SC in response to a key signal of the key board 10. In the control section, when the sub-aural signal delay selection switch is not selected, the microcomputer 11 detects the unselected condition and outputs a high switching control signal (SC) to turn the switching section 9 on, while the clock signals ∅1 and ∅2 and an address signal (AB) are not repeated.

When the sub-aural signal delay selection switch of the key board 10 is selected, the microcomputer 11 detects the selected condition and outputs a low switching control signal (SC) to turn the switching section 9 off and at the same time outputs the clock signals ∅1 and ∅2 and address signals (AB).

When the microcomputer 11 designates consecutively the address of the memory 83 from the first one to the last one at the first time, only the clock signal ∅1 is output. At the next time, when the microcomputer designates from the first address to the last address of the memory 83 in a consecutive order, the clock signals ∅1 and ∅2 are output simultaneously. The two clock signals ∅1 and ∅2 have inverse levels and identical cycles to each other.

The operation and effect of the present embodiment will now be described in detail.

When a multiple aural signal is input to a multiple aural signal input terminal 1, a main aural signal of the multiple aural signal passes through the first band-pass filter 2 and is amplified by the first amplifier 4. Then the signal is output to the main aural signal output terminal 6.

At this moment, a sub-aural signal of the multiple aural signal passes through the second band-pass filter 3. Then, the sub-aural signal is output to the sub-aural signal output terminal 7 either by being amplified at the second amplifier 5 after being delayed by a predetermined time at the delaying section 8, which is under the control of the microcomputer 11, or by being amplified at the second amplifier 5 after passing through the switching section 9 which is under the control of the microcomputer 11.

Under the state when the sub-aural signal delay selection switch of the key board 10 is not selected, the microcomputer 11 detects the unselected condition and does not output the clock signals ∅1 and ∅2 and at the same time outputs a high switching control signal (SC). Thus, when the clock signals ∅1 and ∅2 are not output from the microcomputer 11, the delaying section does not operate. When the high switching control signal (SC) is output from the microcomputer 11, a transistor TR of the switching section 9 becomes conductive and a relay switch RL is turned on. Accordingly, the sub-aural signal passed through the second band-pass filter 3 passes through the switching section 9 and is amplified at the second amplifier 5. Then the signal is output to the sub-aural signal output terminal 7.

However, under the state when the sub-aural signal delay selection switch of the key board 10 is selected, the microcomputer 11 detects the selection condition and outputs a low switching control signal (SC). The low switching control signal (SC) turns the transistor TR of the switching section 9 and the relay switch RL off. Thereby, the sub-aural signal passed through the second band-pass filter 3 cannot pass through the switching section 9.

At this time, the microcomputer 11 outputs a clock signal ∅1 by dividing its own oscillation frequency. Since the clock signal ∅1 is applied to the memory 83 as a read/write control signal ($RD/\overline{WR}$) and is also applied to the input clock generator 84 and output clock generator 85, an input clock signal is generated at the input clock generator 84 and is applied to the analog/digital converter 81 at a sampling frequency (fsc). At the same time, an output clock signal is generated at the output clock generator 85 and is applied to the digital/analog converter 82 and the output holding section 87.

Consequently, the input level of the sub-aural signal passed through the second band-pass filter 3 is set by the input bias setting section 89 at the analog/digital converter 81 and the clamp thereof is regulated by the clamp regulating section 86. Thereafter, the sub-aural signal is converted into a digital signal by being synchronized with the input clock signal of the input clock generator 84. Thus, the sub-aural signal converted into a digital signal is consecutively stored in the addresses of the memory 83 which are designated by the microcomputer 11.

That is to say, the microcomputer 11 designates from the first address to the last address of the memory 83 in a consecutive order. At this moment the time for designating the addresses corresponds to one cycle of the clock signal ∅1.

Accordingly, the sub-aural signal generated at the analog/digital converter 81 is stored in the first address to the last address of the memory 83 in a consecutive order at each time that the clock signal ∅1 becomes low level. However, since the clock signal ∅2 is not output from the microcomputer 11, there is no output signal at the memory 83.

On the other hand, once the microcomputer 11 designates and stores the addresses of the memory 83 up to the last one, the microcomputer 11 outputs the clock signals ∅1 and ∅2 simultaneously and again to designates the addresses of the memory 83 from the first one in a consecutive order. Thereby the sub-aural signals stored in the designated addresses are output to the digital/analog converter 82 and the other sub-aural signals being output from the analog/digital converter 81 are stored again to the designated addresses.

When the clock signal ∅1 is high, the memory 83 becomes a read-state. At this moment, since the clock signal ∅2 is low, the sub-aural signals stored in the designated addresses of the memory 83 are read and then output to the digital/analog converter 82.

Thereafter, when the clock signal ∅1 is low, the memory becomes a write-state. At this moment since the clock signal ∅2 is high, the memory 83 becomes an output disable-state. As a result, the sub-aural signals, which are output from the analog/digital converter 81, are stored again at the designated addresses of the memory 83.

When the addresses of the memory 83 are designated by the microcomputer 11 in a consecutive order, the sub-aural signals stored in the designated addresses are output to the digital/analog converter 82. Thereafter the sub-aural signals being output from the analog/digital converter 81 are stored again to the designated addresses.

The bias of the sub-aural signals, which are input to the digital/analog converter 82, is set by the bias setting section 88. Thereafter the sub-aural signals are synchronized with the output clock signal of the output clock generator 85 so as to be converted into analog signals and then applied to the output holding section 87. Thus, the sub-aural signals applied to the output holding section 87 are set by the bias setting section 88, held and output by the output clock signal of the output clock generator 85. The sub-aural signal, which is the output signal of the output holding section 87, is amplified at the second amplifier 5. Then the signal is output the sub-aural signal output terminal 7.

As described above in detail, the embodiment for the invention has the advantage that since the sub-aural signal is output later than the main aural signal by a predetermined time interval when outputting a main aural signal and a sub-aural signal by separating the multiple broadcasting aural signal being received, it is possible for the listeners and viewers to more easily understand the foreign language The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for delaying a sub-aural signal in a television receiver, comprising:

a first band-pass filter for receiving a main aural signal from a plurality of aural signals input to a multiple aural signal input terminal and developing an output signal therefrom;

a second band-pass filter for receiving the sub-aural signal from said plurality of aural signals input to said multiple aural signal input terminal and developing an output signal; therefrom a first amplifier for amplifying and outputting said output signal from said first band-pass filter to a main aural signal output terminal;

a delaying section for outputting said output from said second band-pass filter by a predetermined delayed time interval in response to a microcomputer when a sub-aural signal delay is selected;

a switching section for providing said output signal from said second band-pass filter in response to said microcomputer when said sub-aural signal delay fails to be selected; and a second amplifier for amplifying and outputting the output signal from said delaying section when said sub-aural signal delay is selected from said switching section when said sub-aural signal delay fails to be selected.

2. The apparatus as claimed in claim 1, wherein said delaying section further comprises:

an input clock generator for developing an input clock signal in response to a first clock signal from said microcomputer;

an output clock generator for developing an output clock signal in response to said first clock signal from said microcomputer;

an analog/digital converter for converting said output signal from said second band-pass filter into a digital signal by setting down said input clock signal developed from said input clock generator at a sampling frequency;

a memory for storing and outputting an output from said analog/digital converter, said output initiates a read/write -state responsive to a level of said first clock signal and said output initiates an output enable-state responsive to a level of a second clock signal of microcomputer;

a digital/analog converter for converting an output signal from said memory into an analog signal by setting down said output clock signal developed from said output clock generator at said sampling frequency; and an output holding section for holding and outputting an output signal from said digital/analog converter by synchronizing said output signal from said digital/analog converter with said output clock signal developed from said output clock generator.

3. A method for delaying a sub-aural signal in a television receiver, comprising the steps of:

(a) receiving a main aural signal from a plurality of aural signals input to a multiple aural signal input terminal;

(b) developing an output signal corresponding to said main aural signal being input to a first band-pass filter;

(c) receiving the sub-aural signal from said plurality of aural signals input to said multiple aural signal input terminal;

(d) developing an output signal corresponding to the sub-aural signal being input to a second band-pass filter;

(e) amplifying said output signal developed at said step (b);

(f) outputting said output signal amplified at said step (e) to a main aural signal output terminal;

(g) outputting said output signal developed at said step (d) at a predetermined delayed time interval in response to a microcomputer when a sub-aural signal delay is selected;

(h) providing said output signal developed at said step (d) in response to said microcomputer when said sub-aural signal delay fails to be selected; and (i) amplifying and outputting an output signal from said step (g) when said sub-aural signal delay is selected and an output signal from said step (h) when said sub-aural signal delay fails to be selected.

4. A method as claimed in claim 3, wherein said step (g), further comprise the steps of:

(j) developing an input clock signal in response to a first clock signal from said microcomputer;

(k) developing an output clock signal in response to said first clock signal from said microcomputer;

(l) converting said output signal developed at said step (d) into a digital signal by setting down said input clock signal at a sampling frequency;

(m) storing and outputting an output from said step (l), said output initiates a read-write-state in response to a level of said first clock signal and said output initiates an output enable-state responsive to a level of a second clock signal of said microcomputer;

(n) converting an output signal from said step (m) into an analog signal by setting down said output clock signal at said sampling frequency; and (o) holding and outputting an output signal from said step (h) by synchronizing said output signal from said step (n) with said output clock signal.

* * * * *